UNITED STATES PATENT OFFICE.

CECILIE LANDE, OF NEW YORK, N. Y.

NUT-BUTTER.

1,070,143.  Specification of Letters Patent.  Patented Aug. 12, 1913.

No Drawing.   Application filed October 16, 1912.   Serial No. 726,135.

*To all whom it may concern:*

Be it known that I, CECILIE LANDE, a citizen of the United States of America, residing in New York, in the borough of Manhattan, county and State of New York, have invented certain new and useful Improvements in Nut-Butter, of which the following is a specification.

This invention relates to an improved butter which is made from the oil of nuts and the taste and appearance of which closely resembles butter made from cow's milk; and the invention consists of a nut-butter which is composed of the refined oil of nuts, eggs, and a seasoning of a small quantity of salt and sugar.

In making my improved nut-butter the refined oil of the cocoanut, Brazilian butternut (which is known in the trade as "butternut") and English walnut, either singly or mixed together, is beaten up with fresh eggs and a seasoning in the following manner and proportions: For every one pound of refined nut-oil two fresh eggs are used. The eggs are first beaten up for about two minutes, after which the refined nut-oil is added drop by drop, while constantly beating the mixture, until finally the entire quantity of oil is properly mixed with the eggs. The mixture is then beaten up for about fifteen minutes, so as to obtain a thoroughly smooth yellowish paste, to which the seasoning, consisting of salt and a small quantity of sugar, in proportion to the quantity of nut-oil and eggs, is added, before being cooled and placed in the molds. In place of the oil of cocoanut, butternut or walnut, any other suitable refined oil of nuts can be used. The resulting nut-butter has a very agreeable and pleasant taste which resembles closely the taste of butter made from cow's milk, is perfectly pure, requires no artificial coloring, and has the appearance of freshly-churned sweet dairy-butter.

I claim:

1. A nut-butter composed of a refined nut-oil, eggs and seasoning.

2. A nut-butter composed of a mixture of the refined oils of cocoanut, butternut and walnut, eggs and a seasoning of salt and sugar.

In testimony, that I claim the foregoing as my invention, I have signed my name in presence of two subscribing witnesses.

CECILIE LANDE.

Witnesses:
PAUL GOEPEL,
JOHN MURTAGH.